Jan. 14, 1969  H. W. LICHTENBERGER ET AL  3,421,336
INTRANSIT LIQUEFIED GAS REFRIGERATION SYSTEM
Filed June 5, 1967  Sheet 1 of 3

INVENTORS
HORST W. LICHTENBERGER
DAVID P. MAURER
BY
John C. Zedmer
ATTORNEY

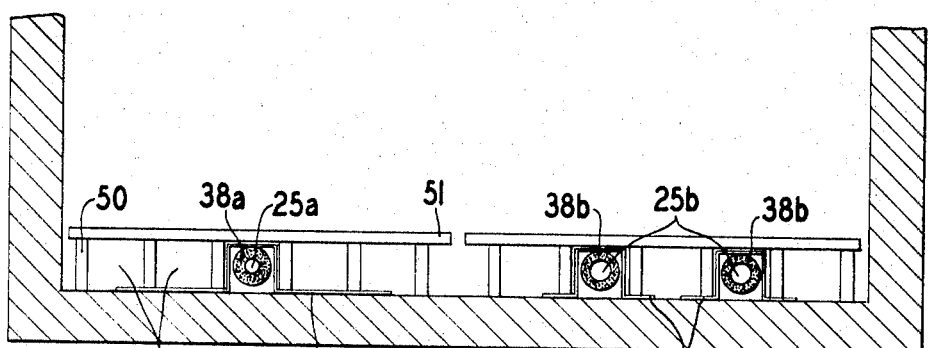
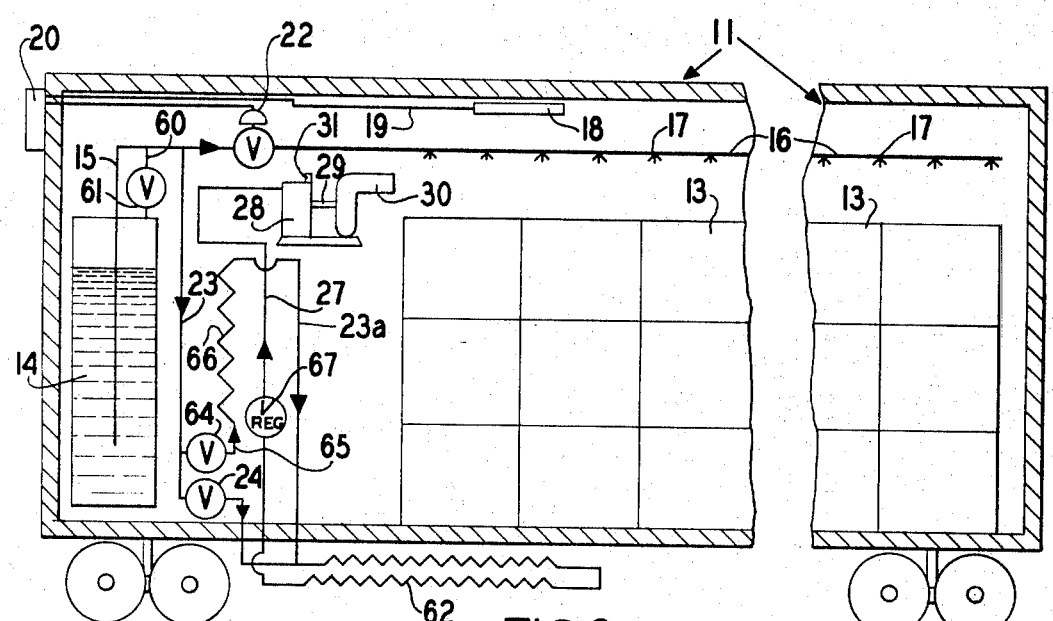
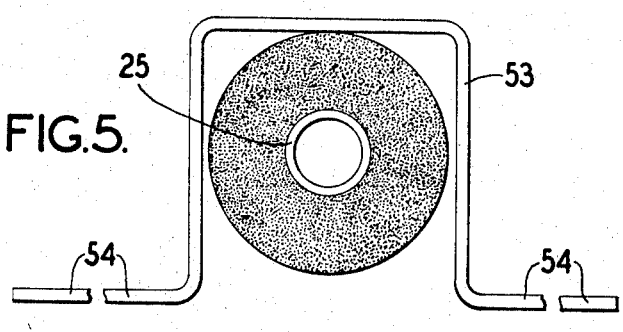

INVENTORS
HORST W. LICHTENBERGER
BY DAVID P. MAURER

ATTORNEY

United States Patent Office 3,421,336
Patented Jan. 14, 1969

3,421,336
INTRANSIT LIQUEFIED GAS REFRIGERATION SYSTEM
Horst W. Lichtenberger, Tonawanda, and David P. Maurer, Williamsville, N.Y., assignors to Union Carbide Corporation, a corporation of New York
Filed June 5, 1967, Ser. No. 643,709
U.S. Cl. 62—45       9 Claims
Int. Cl. F17c 5/04; F17c 17/02; B60h 3/04

ABSTRACT OF THE DISCLOSURE

A system for more uniform distribution of refrigeration in long-haul trailers and railcars is provided by intermittently spraying cold fluid into the product chamber and continuously expanding vaporized cold liquid into the same chamber with the production of external work which is recovered to circulate the sprayed cold fluid.

Background of the invention

This invention relates to a method of and apparatus for the intransit preservation of perishables by controlled refrigeration from a low-boiling liquefied gas.

Until recently, preservation of perishable food products by intransit refrigeration has been accomplished by inefficient and expensive systems. The high costs associated with inefficient preservation systems have been passed on to the consumer of food products. Moreover, in some instances the consumer has received a sub-standard product due either to inadequate refrigeration or freeze damage.

For example, the most widely used intransit refrigeration system employs a closed refrigeration circuit in which a refrigerant fluid is circulated through coils and air is blown across the cold coils by a fan. The vaporized refrigerant is pressurized, cooled, condensed, expanded and recirculated through the coils in a continuous flow manner. Among the limitations of this closed cycle refrigeration system are the need for external power, mechanical complexity and limited as well as slow refrigeration cooldown capability.

These drawbacks have been avoided by the relatively new intransit refrigeration system described in Kane et al. U.S.P. 3,287,925 in which a low boiling liquefied gas is stored in a container as liquid and discharged in liquid spray form through openings in an overhead conduit into the product storage chamber. The liquid discharge is controlled in response to a temperature sensing device within the chamber. This liquid spray system eliminates the external power requirement, can provide large and variable refrigeration capacity, and for many applications has only one moving part—the liquid discharge valve. Accordingly, it has enjoyed remarkable commercial success and is extensively used on trucks, trailers and railway cars for intransit nitrogen refrigeration and atmosphere control of a wide variety of perishable food products including fruits, vegetables, meat and frozen commodities.

It has been discovered that certain special problems are encountered in long haul service (e.g. over 400 miles between loading and unloading points) as distinguished from short hauls, and in particular where the transported products must be kept above freezing to avoid deterioration, e.g. fruits and vegetables. These problems are in part due to the well-known characteristics of such shipments. For example, a relatively long storage chamber such as a semi-trailer or a railcar may be filled nearly to its top with boxes of perishable food products from which the field heat has been removed, usually by water cooling. The chamber is then closed and shipped to its destination, which may be several days away. The chamber is not opened during this period but the products must be kept in a rather narrow temperature range, usually between 32 and 45° F. depending on the particular products shipped.

We have found that the gas temperature varies considerably in different parts of the storage chamber, even if the same quantity of stored cold refrigerant fluid is introduced per unit length of chamber. For example, the product temperature in the lowest zone of the chamber becomes warmer than at the chamber ends or near the overhead gas space despite the fact that cold gas tends to settle and warmer gas tends to rise. The main reasons for this temperature variation within the stored product are: (1) the lowest chamber portion is virtually completely filled with boxes of product and gas circulation is severely limited, and (2) the entire chamber bottom represents surface area for atmospheric heat inleak. It is also known that the temperatures in the end zones of the storage chambers tend to be higher than in the middle zone, due to the greater surface area and atmospheric heat inleak to the former.

The result of these temperature distribution patterns is a tendency for the product in the bottom and end zones of the chamber to become too warm and deteriorate during shipment, or alternatively the product in the upper center zone becomes too cold and even suffers freeze damage.

It is an object of this invention to provide an improved method of and apparatus for the intransit refrigeration of perishable commodities, in which the entire product storage chamber is maintained at substantially uniform predetermined temperature for an extended period.

Another object is to provide such method and apparatus in which liquefied gas is sprayed in a relatively long perishable product storage chamber used for long haul shipments under conditions such that the end-to-end chamber temperature is substantially uniform and refrigeration usage is minimized.

Other objects and advantages of this invention will be apparent from the ensuing disclosure and appended claims.

Summary

In the method aspect of the invention, pressurized low-boiling gas having a boiling point at atmospheric pressure below about −20° F., e.g. liquid nitrogen, is provided in a mobile storage chamber holding perishables substantially surrounded by a gas space.

The gas temperature within the storage chamber is monitored, as for example by a temperature sensing bulb or thermocouple, and cold fluid is intermittently dispensed from the storage container in response to the monitored temperature. This cold fluid is sprayed (as liquid, liquid-vapor, or vapor) as a multiplicity of discrete streams into the storage chamber so as to maintain the monitored gas temperature at preferably about 32–45° F. This range is of course above freezing and yet low enough to greatly reduce the product respiration rate and prolong its useful shelf life. However, this refrigeration system is applicable for storing products at uniform temperatures between −10° F. and 60° F.

Cold liquid is also continuously dispensed from the storage container, vaporized and expanded into the storage chamber gas space with the production of external work. The latter is recovered to circulate the sprayed cold fluid within the storage chamber and maintain the surrounding gas space at substantially uniform temperature. No external source of power is required to operate the fluid circulating means, which is an important advantage for mobile equipment normally used without electric power generators. This is particularly important with railway cars which may stand in freight yards or remote areas for many hours while new trains are being assembled. The energy for fluid circulation is supplied solely from the pressurized liquefied gas provided in the storage container.

In the apparatus of this invention, the storage chamber for perishable products is provided with its longitudinal axis horizontally aligned with end sections separated by a middle section. Spray conduit means are positioned within the upper portion of the storage chamber and extend substantially the entire length thereof, with openings spaced along the conduit length for cold fluid discharge. First liquid discharge conduit means are joined at one end to the liquid storage container, and joined at the other end to a first end of the spray conduit means. The apparatus also requires liquefied gas flow control means comprising a temperature sensing element positioned within the storage chamber, and a control valve in the first liquid discharge conduit being connected to the sensing element to be responsive to the storage chamber temperature.

Second liquid discharge conduit means also communicate at one end with the storage container, and heat exchanger means communicate with a second end of the second liquid discharge conduit means for vaporizing the liquefied gas. This heat exchanger is preferably positioned within the storage chamber to recover heat from the product storage chamber needed for the vaporization. A gas expander is joined to the heat exchanger for work expanding the vaporized and warmed liquefied gas from higher to lower superatmospheric pressure, and the expander is powered solely by the gas expansion to produce rotational energy. A fan is positioned in the upper portion of the product storage chamber at one end thereof and adjacent the spray conduit for circulating discharged cold fluid the end-to-end length of the chamber upper portion. The fan is joined to the gas expander for receiving the latter's rotational energy. The fan circulates cold refrigerant fluid from both the spray conduit and the vaporizer.

As compared with the intransit refrigeration system described in the Kane et al. patent, this invention improves product temperature uniformity in long hauls, as will be demonstrated hereinafter.

*Brief description of the drawings*

In the drawings:

FIG. 4 is a cross-sectional end view of a floor vaporizer-support assembly especially suitable for use in railway cars.

FIG. 5 is an enlarged cross-sectional end view of the refrigeration conducting plate-insulated conduit assembly of FIG. 4.

FIG. 6 is a schematic view taken in cross-sectional elevation of a railcar incorporating another embodiment with a vertical internal heat exchanger and an atmospheric vaporizer.

*Description of preferred embodiments*

Figure 1:
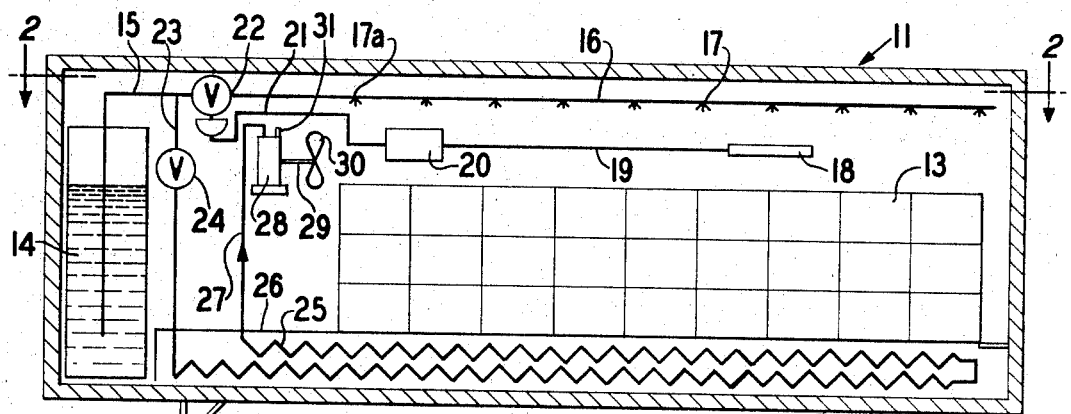
FIG. 1 is a schematic view taken in cross-sectional elevation of a truck semi-trailer incorporating one embodiment of the invention.
Figure 2:
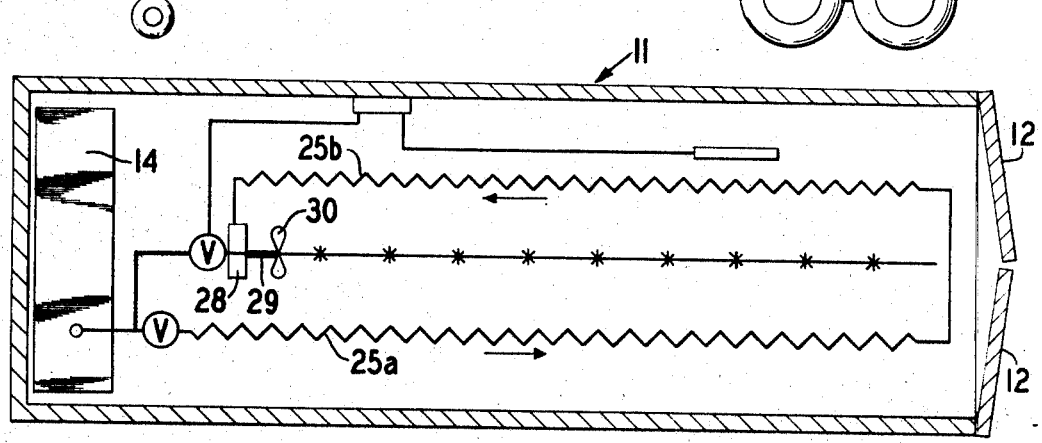
FIG. 2 is a schematic plan view of the FIG. 1 apparatus taken along the line 2—2.

Referring now to the drawings, FIGS. 1 and 2 illustrate a simple embodiment in which a mobile thermally insulated storage chamber 11 is provided for perishable products stacked therein. This chamber 11 may be of standard construction for typical mobile refrigerated chambers, e.g. reinforced aluminum siding outer walls, plywood panelled inner walls and asbestos or plastic foam insulating material between the two walls. The chamber need not be air-tight, as access means such as rear doors 12 are needed for insertion and removal of the perishable products 13. Although the primary function of storage chamber 11 is to refrigerate the perishable products 13, the preferred liquified gases such as nitrogen also control the atmosphere within the chamber and provide an inert blanket surrounding the product. In this manner its respiration rate is slowed down and the deterioration rate retarded, exclusive of the refrigeration.

A double-walled mobile thermally insulated container 14 is associated wtih storage chamber 11 for storing pressurized low-boiling liquified gas having a boiling point at atmospheric pressure below about −20° F. The construction of such containers is well-known and is for example depicted in Loveday et al. U.S. Patent No. 2,951,-348. Container 14 is depicted within storage chamber 11 but it also may be positioned outside this chamber. Container 14 includes an outer shell completely surrounding an inner storage vessel to form an evacuable insulation space therebetween. This space is preferably filled with an efficient solid thermal insulating material, as for example alternate layers of radiation-impervious barriers such as aluminum foil separated by low conductive fibrous sheeting as for example glass fibers. This particularly highly efficient insulation is described in U.S. Patent No. 3,007,596 to L. C. Matsch. Other suitable insulating materials include layers of aluminum coated-polyethylene terephthalate. Alternatively, powdered insulation material for example perlite or finely divided silica may be employed.

To remove gases accumulating in the evacuated insulating space, an adsorbent material as for example calcium zeolite A, or a gettering material as for example powdered barium may be provided therein to retain a high level of insulating quality.

Low-boiling liquefied gases which are suitable for use as refrigerants in the present invention are those which have a boiling point at atmospheric pressure below about −20° F. Examples of such liquefied gases are liquid air, liquid argon, liquid carbon dioxide, liquid helium, and liquid nitrogen. Liquid nitrogen is preferred because of its inertness and relative ease of separation from air. While the subsequent discussion refers specifically to nitrogen, it is to be understood that all of the aforementioned gases are suitable.

The storage vessel within storage container 14 is filled with liquefied nitrogen by means well known to the prior art, as for example connecting a source of liquefied nitrogen stored at above atmospheric pressure to the container. If the liquid nitrogen is stored at a pressure below the operating pressure of container 14, a suitable pump would be employed and, usually, additional heat would be added to the pressurized liquid before transferring it into container 14. The liquid nitrogen is preferably charged into container 14 and stored therein at saturated conditions and at temperatures corresponding to a vapor pressure above 10 p.s.i.g. with the entire liquid and vapor substantially in equilibrium. If one of the aforementioned highly efficient insulations are used, there is no appreciable amount of heat inleak to the inner storage vessel of container 14 and the stored liquid nitrogen is dispensed only by this as-charged vapor pressure. Alternatively the liquid nitrogen may be charged to container 14 under non-saturated conditions and even in the subcooled state. Under these circumstances it would probably be necessary to provide means for building sufficient pressure on demand to discharge the liquid. Those skilled in the art will appreciate that this heat may be introduced externally, using the well-known pressure building coil. The latter includes a liquid discharge conduit, an atmospheric heat vaporizer and a return conduit for the resulting vapor to the container gas space (not illustrated).

As still another variation known to the art, a less efficient heat insulating material may be used so that sufficient atmospheric heat inleak is available to vaporize sufficient stored liquid refrigerant to form gas pressure to insure liquid discharge on demand.

It is preferred to store the liquid refrigerant at pressure below about 100 p.s.i.g., because at higher pressures the inherent lag characteristics of presently known temperature sensing elements will not permit adequate control of the liquid refrigerant withdrawal. As mentioned previously, the storage pressure is preferably above about 10 p.s.i.g. This pressure level is needed to operate presently available gas expanders.

First liquid discharge conduit 15 is joined at one end to storage container 14 and joined at the other end to overhead spray conduit 16 having a series of spaced openings 17 therein. Although depicted as a relatively short run, first conduit 15 may in fact extend part or all of the end-to-end length of storage chamber 11 and may be uninsulated or partly insulated, as desired. In this manner the cold fluid may be kept virtually entirely in the liquid state, may be partly vaporized or completely vaporized. In either of the last two constructions the heat of vaporization is recovered by the gas in the upper section of chamber 11. Spray conduit 16 preferably extends the end-to-end length of product storage chamber 11 for discharge of cold fluid into such chamber as a multiplicity of discrete streams. Openings 17 may be oriented either horizontally or downwardly in the conduit's circumference. In some instances it may be preferred to locate the holes or orifices in the upper portion of conduit 16 so as to avoid dripping of liquid refrigerant directly on the product 13 after shutoff of the control valve.

A liquefied gas flow control system is provided, including temperature sensing element 18 as for example a bulb positioned within the storage chamber 11 gas space. This bulb is connected by signal transmitting means 19 to temperature controller 20, and signal transmitting means 21 provides communication between the controller and control valve 22 in liquid discharge conduit 15. The flow control means may be electrically or pneumatically operated.

Second liquid discharge conduit 23 having control valve 24 therein is illustrated as communicating at one end with liquid storage container 14 through first liquid discharge conduit 15. Alternatively one end of conduit 23 may extend directly into liquid storage container 14 as does first conduit 15. In either event the second end of second liquid discharge conduit 23 joins with heat exchanger means 25, illustrated as a vaporizer extending the end-to-end length of chamber 11 beneath floor 26 but in thermal association therewith (discussed in detail below).

Heat exchanger 25 preferably comprises two passes, the first section 25a extending to the opposite end of chamber 11 near doors 12 and the second section 25b returning to the chamber end near liquid storage container 14. The two heat exchanger sections 25a and 25b are preferably positioned on either side of the longitudinal centerline of chamber 11, and provide sufficient heat transfer surface area to insure vaporization and superheating of the cold liquid flowing thereto. This heat is supplied in larger part by the warmer circulating gas contacting the outer surface of the conduit passes 25a and 25b.

The discharge end of heat exchanger 25 is joined by warmed vapor conduit 27 communicating with gas expander 28 preferably centrally positioned in the upper portion of chamber 11 near the front end of spray conduit 16. As illustrated the front end of spray conduit 16 is also the inlet end, but the conduit might also be positioned with its discharge end at the front of chamber 11 adjacent expander 28. The latter is preferably a commercially available sliding vane-type air motor with an inlet pressure of about 10–25 p.s.i.g. operating at 200–1500 r.p.m. or greater, but a turbine or piston type expander may be used. Expander 28 is joined by shaft coupling means 29 to fan 30 also positioned near spray conduit 16 and preferably between the liquid storage container 14 and the first spray opening 17a. If the desired operating speed of fan 30 is not suitable for the driving motor 28, speed change by belt drive or gears may be used. If the latter means is used, the shaft coupling means 29 may include for example a pair of flexibly connected metal hubs to accommodate shaft misalignment.

The exhaust gas from expander 28 is preferably directed into chamber 11 through the discharge port 31. Alternatively this exhaust gas could be passed to overhead spray conduit 16 for discharge through spaced openings 17 along with the cold vapor. Direct discharge through expander port 31 at atmospheric pressure is preferred to obtain maximum pressure drop across the expander. This in turn develops as much shaft power as possible for driving fan 30.

In a preferred embodiment of the floor vaporizer 25 shown schematically in FIGS. 1 and 2, a multiplicity of heat conducting means each thermally associated with passageways 25a and 25b are longitudinally spaced from each other at varying intervals so that substantially equal quantity of heat is transferred from the storage chamber 11 to the liquid-vapor per unit length of the vaporizer 25 and of the chamber. It should be recognized that when cold liquid refrigerant discharged from storage container 14 is introduced at one end of floor vaporizer 25 for vaporizing and superheating therein, the temperature difference ($\Delta T$) between the cold fluid in passageways 25a and 25b and the product 13 varies from end to end of chamber 11. For example at the end where the cold liquid is introduced to passageway 25a the $\Delta T$ is relatively large whereas the temperature difference between the vapor and the product 13 at the opposite end of passageway 25a is significantly smaller. Accordingly, the driving force for heat transfer varies substantially along the vaporizer from end to end of chamber 11. On the other hand, it is desirable to transfer substantially equal quantities of refrigeration (or remove equal quantities of heat) to the entire floor area of chamber 11 and thus avoid localized freezing or excessive warming of the stored product. In this maner, the floor area can be maintained within the desired temperature range, preferably 32 to 45° F.

The floor structures of commercially employed product storage chambers, e.g. truck trailers or railcars, usually comprise wood slats or shaped metal such as channels or corrugations which are spaced apart and shaped to provide adequate structural strength and light weight, and also to provide spaces for adequate longitudinal air circulation under the product load. The liquid-vapor conduits 25a and 25b are supported within such depressions in the floor and thermally insulated therefrom. The thermal insulation should be sealed from the atmosphere to prevent moisture penetration and consequent loss of efficiency. The fan circulates gas from end-to-end of the chamber 11 floor in passageways formed by such channels or corrugations to recover refrigeration from the liquid-vapor, as discussed later in detail.

Figure 3:
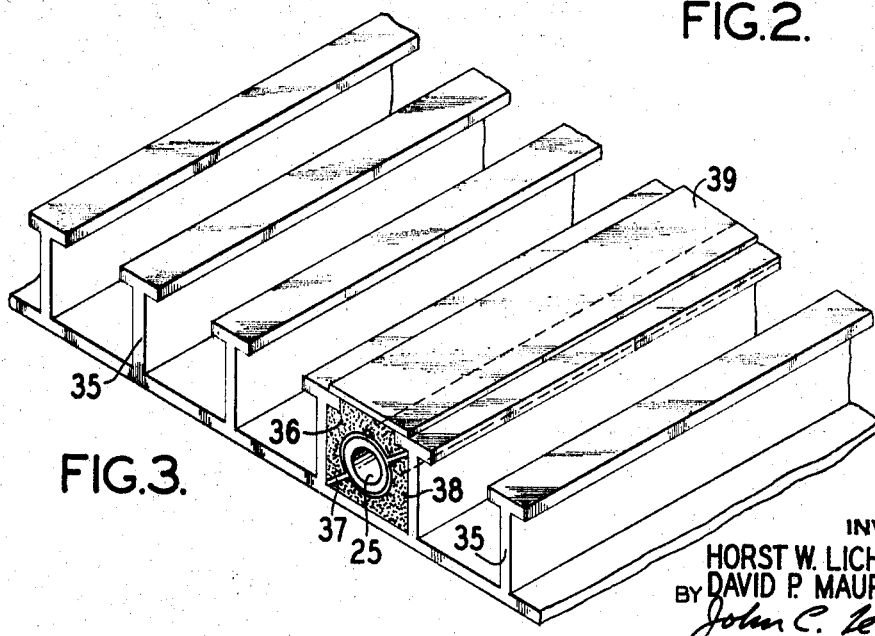
FIG. 3 is an isometric view of a floor vaporizer-support assembly suitable for use in the FIGS. 1–2 apparatus.

FIG. 3 illustrates one means for achieving this temperature uniformity in the chamber floor area, and comprises a multiplicity of metal heat conducting and support means 37 each joined to liquid-vapor passageways 25a and 25b. These heat conductors are longitudinally spaced from each other at varying intervals such that substantially equal quantity of heat is transferred from the storage chamber 11 to the liquid-vapor per unit length of the chamber.

The specific floor vaporizer constructions to be described hereinafter and illustrated in FIGS. 3–5 are not our invention but claimed in a copending application "Intransit Liquefied Gas Refrigeration Apparatus" filed in the name of Lester K. Eigenbrod. These floor vaporizer constructions may be effectively used as the means for vaporizing and superheating the cold liquid continuously discharged from storage container 14 in accordance with our refrigeration system.

Referring now to FIG. 3, this floor vaporizer embodiment could be employed in the FIGS. 1–2 system and is preferred for use in highway trailers. The floor structure consists of multiple adjacent metal channels 35 spaced apart and extending from end-to-end of the storage chamber 11. Within the space 36 between selected channels, liquid-vapor refrigerant conduit 25 is located and supported centrally by spaced metal support and heat conduction means 37, e.g. metal support clips or washers serving as controlled thermal contacts with the thermally conductive metal channels 35. Although the same element 37 is illustrated as performing both the refrigerant conduit support function and the thermal conduction function, separate elements could be employed. In this event the conduit support elements might be formed of non-conductive material such as high-strength plastic and the thermal conductors could be metal washers surrounding conduit 25 but of sufficient diameter to touch the walls of channels 35.

Refrigerant conduit 25 is surrounded by thermal insulating material 38, as for example urethane plastic closed cell foam. Alternatively, insulation powders or wrapped insulation layers may be used. Metal plate 39 may be used to cover the channel-refrigerant passageway-clip assembly, and the product 13 is positioned thereon. As illustrated in FIG. 2, refrigerant conduit 25 extends from the front end of the trailer to the rear end along the centerline of one half and returns to the front end along the centerline of the other half of the trailer. It has been found that substantially all the vaporization occurs in the outgoing leg 25a and superheating of the refrigerant occurs in the return leg 25b.

Metal clips 37 are spaced more closely together along return leg 25b than outgoing leg 25a because of the lower $\Delta T$ which exists along the latter between the refrigerant and the floor. The refrigerant gas propelled through chamber 11 by fan 30 is passed between open channels 35 from the rear to the front end thereof, and recovers refrigeration by flow across the channel surfaces cooled by the moving refrigerant fluid. This refrigeration is transferred by solid condition to the channels 35 through spaced metal clips 37, and also by conduction through thermal insulation 38 surrounding the cold conduit 25.

In one embodiment suitable for commercial use in a highway trailer, a system similar to that illustrated in FIGS. 1–3 is used. The liquid refrigerant container 14 is a 400-gallon rectangular tank insulated with alternate layers of aluminum foil and glass paper in a vacuum space between the inner liquid vessel and the outer casing. This tank is located at the storage chamber front end, and is charged with saturated liquid nitrogen at about 22 p.s.i.g. vapor pressure. The floor mounted vaporizer is very similar to FIG. 3, and comprises 5/16-inch O.D. x 0.030-inch wall stainless steel tubing supported at spaced intervals within 1½-inch deep aluminum floor channels spaced about 2-inches apart by stainless steel wire clips. These support clips are initially longitudinally spaced about 4-feet apart for the vaporization portion of the heat exchanger, with increasingly closer spacing down to about 4-inches apart at the outlet end of the superheating portion of the heat exchanger. The space surrounding the heat exchanger tube within the channel is filled with foamed-in-place closed cell urethane plastic insulation. Two passes of insulated tubing are used within the trailer floor, and about 10 lb./hour of nitrogen is continuously passed through the heat exchanger in the 40-foot long by 8-foot wide trailer. This flow rate is sufficient to develop power to operate an axial flow fan mounted above the stored product and facing toward the spray header, and circulating at least about 300 c.f.m. gas within the chamber. Liquid nitrogen is intermittently withdrawn from the 400-gallon tank for discharge through the spray openings at an equivalent rate of about 10–30 lbs./hour depending upon the refrigeration needed.

FIGS. 4 and 5 illustrate another floor vaporizer which is particularly suitable for railroad cars having a pallet-type wood floor. Such floor consists of longitudinal stringers 50 and cross planking 51 positioned to form longitudinal spaces 52. Liquid-vapor refrigerant conduit 25 is shown as including single outgoing pass 25a and two return passes 25b. Each of these passes is located in a longitudinal space surrounded by insulation 38. In this embodiment the heat transfer rate between the refrigerant liquid-vapor is controlled by varying the insulation thickness, provided in rolled form around each pass 25a and 25b. A relatively thicker insulation layer 38a is provided around outgoing pass 25a because of the larger $\Delta T$, and a relatively thinner insulation layer 38b is positioned around return passes 25b because of the lower $\Delta T$ between refrigerant vapor and the surrounding frame (and product).

The liquid-vapor conduit and insulation assemblies are each covered with a raised metal plate assembly 53 having flange sections 54. The latter extend transversely beneath the wood floor 51, and this conduct heat transversely within the floor to longitudinal spaces 52 through which the fan-circulated gas flows. As illustrated, flanges 54 have widths less than one-half the spacing between liquid-vapor refrigerant passes 25. This is for ease of fabrication.

As with the FIG. 3 floor vaporizer, gas is circulated longitudinally from end-to-end through spaces 52 to extract refrigeration from the refrigerant flowing through passes 25. However, in contrast to FIG. 3, the floor assembly 50–51 is constructed of low conductive wood instead of relatively highly conductive metal. This means that the refrigeration is distributed (1) by conduction along raised metal plate assembly 53–54, and (2) by conduction through the layered insulation 38a and 38b.

FIG. 6 illustrates another embodiment of the intransit refrigeration system of this invention, differing in certain particulars from the FIGS. 1–2 arrangement. For example, in addition to liquid refrigerant withdrawal from storage container 14 through first discharge conduit 15, vapor may be released from the gas space of container 14 through discharge conduit 60 having pressure regulating valve 61 therein set to open at a predetermined pressure. Provision for vapor discharge (in addition to the usual unillustrated safety valving) may for example be desirable if relatively poor thermal insulation is employed in container 14. Vapor conduit 60 joins liquid withdrawal conduit 15 and thereby supplements the fluid passed into chamber 11 through spray conduit openings 17.

Another distinguishing feature of FIG. 6 is that second liquid discharge conduit 23 joins through valve 24 with external heat exchanger 62 where the liquid may be vaporized and superheated by atmospheric heat. This embodiment does not include the FIGS. 1–5 floor vaporizer, but instead employs vertically oriented vaporizer 66. Also the atmospheric vaporizer 62 may be used to provide greater energy to the blower-type fan 30. If additional refrigeration is needed for the product 13 (such as during periods of warm ambient temperature), valve 64 in branch conduit 65 is opened and at least part of the fluid in second liquid discharge conduit 23 is diverted thereto for flow through vertically oriented internal heat exchanger 66. The vapor emerging therefrom is passed through conduit 23a upstream of external atmospheric vaporizer 62. The refrigeration of this vaporizing liquid is recovered by gas flowing upwardly from the chamber floor, as circulated by blower 30. When the external temperature is about 35° F. or colder, little or no refrigeration may be required inside the storage chamber 11, and all the refrigerant needed for driving the blower 30 is vaporized and warmed in external heat exchanger 62 only. Under these circumstances valve 64 is closed.

FIG. 6 illustrates a centrifugal type blower 30 to circulate gas through the product chamber 11 instead of the axial flow unit employed in the FIGS. 1–2 system. As used herein the term "fan" contemplates any rotating device capable of circulating gas. In this context blower 30 is a centrifugal-type fan and may be the commonly used variety consisting of a circular cage and rotating vanes. The gas enters the cage eye and flows around the cage for radial discharge. Axial flow or propeller type fans are preferred because of lower power consumption than centrifugal blowers for comparable gas recirculation rates.

Still another feature of the FIG. 6 embodiment is the use of pressure regulator 67 in warmed vapor conduit 27 between vaporizer-superheater 62 and expander 28. Regulator 67 may for example be set to maintain about 10 p.s.i.g. at the expander inlet. If the storage container 14 pressure rises above 10 p.s.i.g. the gas circulation rate provided by blower 30 is not increased above a desirable level. Also, pressure regulator 67 provides a convenient means for varying the expander and fan speed as desired so as to permit a lower recirculation flow rate during winter than during summer conditions.

Figure 7:
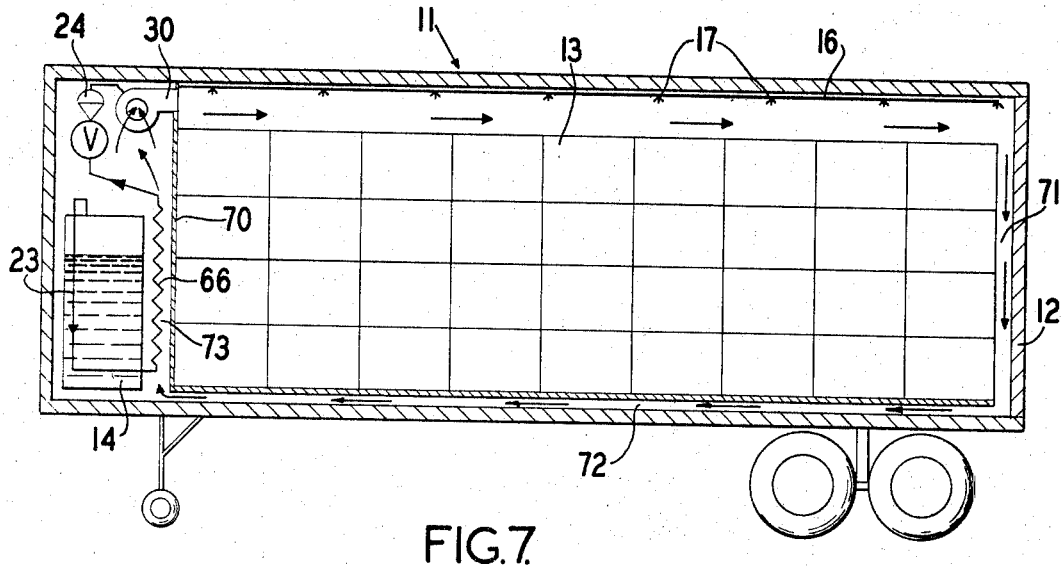
FIG. 7 is a schematic taken in cross-sectional elevation of still another embodiment, showing the fan and gas circulation path in greater detail.

FIG. 7 illustrates the gas circulation pattern provided by fan 30 through chamber 11 loaded with product 13. The expander driving fan 30 is positioned behind the fan and thus not illustrated. Fan 30 is preferably attached to baffle or bulkhead 70 to insure that the discharge flow passes outwardly over the top of the product load 13 and cannot be bypassed ineffectively directly back to the blower suction. The cold fluid emerging from spaced openings 17 in spray conduit 16 is circulated by the discharge flow from blower 30. Projections or flues are preferably provided along the side and rear walls of the chamber 11 as necessary to prevent loading the product tight against the walls. Such projections permit gas circulation downwardly adjacent the product as for example in rear end space 71, and then through longtiudinal passageways 72 in the floor beneath the product 13. During this return flow the circulating gas will be partially recooled by the floor vaporize if used (see FIGS. 1–5) or recooled while flowing upwardly at the front end 73 of chamber 11 by the vertical internal vaporizer 66 of FIGS. 6 and 7. The recooled gas is returned to the suction of blower 30 for recirculation. Excessive pressure buildup in chamber 11 is avoided by vent openings through a wall of storage chamber 11.

A series of tests were conducted which illustrate the qualitative advantages of this invention as compared to a similar nitrogen spray refrigeration system without the circulation fan. In this prior art system hereinafter designated as system A, lettuce was shipped in a highway trailer from Salinas, Calif. to Chicago, Ill. The trailer was 40 feet long, 8 feet wide and was refrigerated by saturated liquid nitrogen discharged from the storage container at 15 p.s.i.g. vapor pressure through the overhead spray tubes. The control set point was 35° F. for system A and the succeeding systems.

In system B the same type of spray tube assembly was used but a centrifugal-type fan as illustrated in FIG. 7 was positioned at the front end along with the vertically aligned internal vaporizer-superheater 66. The air motor was the sliding vane type suitable for 10–100 p.s.i.g. inlet pressure, and rated at 1600 r.p.m. at 20 p.s.ig. inlet pressure and atmospheric exhaust pressure. The centrifugal fan was rated for delivering 660 c.f.m. air flow against a static pressure of 0.3 inch water pressure at 1000 r.p.m. The motor was operated at about 225 r.p.m. and coupled through spur-gears to the fan operated at about 500 r.p.m. to deliver 300 cu. ft. per min. gas against 0.05 inch water head pressure. The test was stationary and the product was simulated by loading the chamber with empty boxes. The trailer was the same size as used in system A. The gas circulation rate was varied between 125 and 410 cu. ft. per min. (c.f.m.).

In system C the same type of trailer and feed tube-spray tube assembly was again used along with the centrifugal fan of system B. However a floor vaporizer-superheater of the type illustrated in FIGS. 1–3 was employed instead of the vertical vaporizer-superheater. This heat exchanger was sized to provide about the same heat transfer capacity as the vertical unit used in system B. The test was stationary and the product was again simulated by loading the chamber with empty boxes. The gas circulation rate provided by the centrifugal-type fan was 300–325 c.f.m.

In system D the same type of trailer was again used, and equipped with two spray tubes 16 each extending one-half the length of the trailer-chamber. The same type of floor vaporizer-superheater was employed as in system C but an axial flow propeller type fan was provided to circulate the gas in the same pattern as illustrated in FIG. 7. This fan was 10 inches in diameter with four blades and capable of delivering 600 c.f.m. air flow against a static presssure of 0.05 inch water pressure at 1500 r.p.m. The motor and fan were directly coupled and both run at about 1500 r.p.m. The test was stationary but boxed lettuce was used as the stored product.

Figure 8:
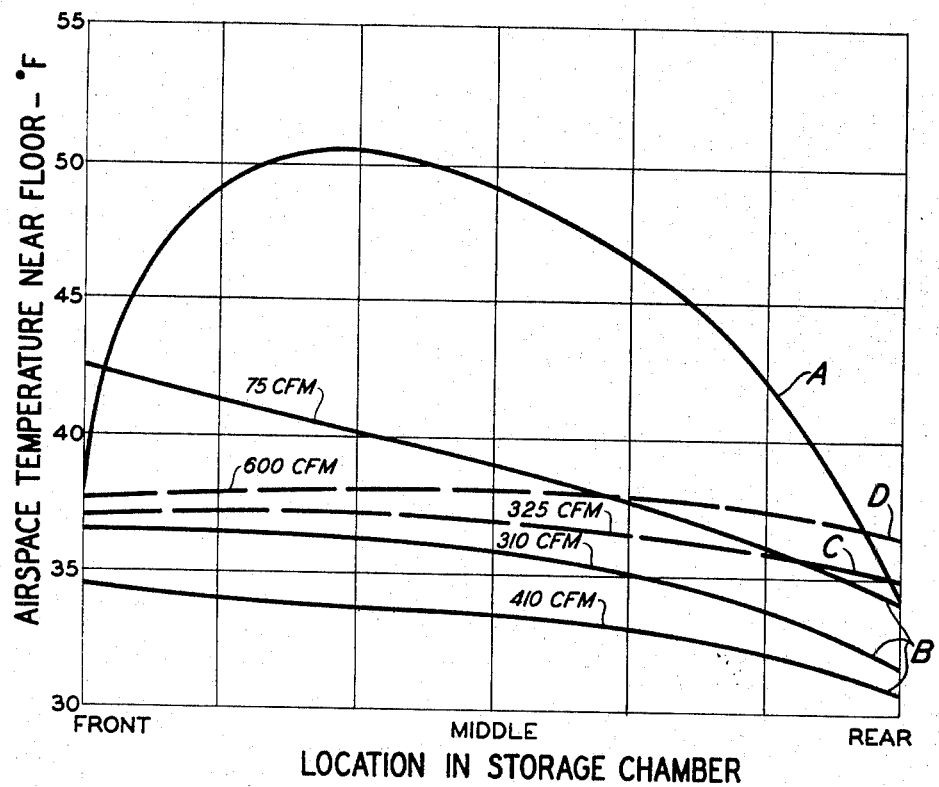
FIG. 8 is a graph showing temperature distribution in the gas space near the floor of a truck semi-trailer, with and without this invention.

The performance of the four systems is summarized in the FIG. 8 graph showing the temperature distribution in the gas space about 1 inch above the trailer product chamber floor over a period of 100 hours. The temperatures were obtained from thermocouples placed at the front, middle and rear of the chamber and continuously recorded during each test. Although the data is not susceptible to quantitative comparison because the conditions and equipment were not identical, system A may be qualitative compared with systems B–D. It is apparent that substantial improvement in the uniformity of gas space temperature near the floor of a long haul highway trailer is obtained for systems B, C and D having a circulating fan, as compared to a system using only a spray conduit for refrigerant distribution. For system B, the data show that increased fan circulation rates improve the temperature distribution with about 300 c.f.m. being a minimum desirable recirculation rate. However, systems C and D utilizing a floor mounted vaporizer-superheater provide somewhat better temperature uniformity than system B for the same gas recirculation rate.

Although preferred embodiments of the invention have been described in detail, it is contemplated that modifications of the method and apparatus may be made and that some features may be employed without others, all within the spirit and scope of the invention. For example, this refrigerating system may also be used with stationary equipment. As another variation the FIGS. 1–2 semi-trailer embodiment may be provided with an external atmospheric heat exchanger 62 similar to the railroad car embodiment FIG. 6.

What is claimed is:

1. A method for the preservation of perishable products comprising the steps of:
   (a) providing pressurized low boiling liquefied gas having a boiling point at atmospheric pressure below about −20° F. in a thermally insulated storage container associated with a storage chamber holding perishables partially surrounded by a gas space;
   (b) monitoring the gas temperature within said storage chamber;
   (c) intermittently dispensing cold fluid from said storage container in response to the monitored gas temperature and spraying said cold fluid as a multiplicity of discrete streams into said storage chamber so as to maintain said monitored gas temperature in a selected temperature range of −10° F. to 60° F.; and
   (d) continuously dispensing cold liquid from said storage container, vaporizing the dispensed cold liquid, expanding the resulting vapor into the storage chamber gas space with the production of external work, and recovering said external work to circulate the sprayed cold fluid within said storage chamber and maintain the gas space at substantially uniform temperature.

2. A method according to claim 1 which the intermittently dispensed cold fluid is liquid, and such liquid is partially vaporized prior to said spraying into said storage chamber.

3. A method according to claim 1 in which the continuously dispensed cold liquid is heat exchanged with the warmer storage chamber for said vaporizing.

4. A method according to claim 1 in which said storage chamber is horizontally aligned with end sections joined by a center section, and the continuously dispensed cold liquid is heat exchanged with the entire end-to-end length of said storage chamber in the lowest zone thereof for said vaporizing, the vaporized liquid being super heated during such heat exchange such that substantially equal quantity of heat is transferred from the storage chamber to the liquid-vapor per unit length of such chamber between the ends thereof.

5. A method according to claim 1 in which the continuously dispensed cold liquid is vaporized by heat exchange with the environment surrounding said storage container and chamber before the expansion with production of external work.

6. A method according to claim 1 in which the vaporized cold liquid is superheated by heat exchange with the environment surrounding said storage container and chamber before the expansion with production of external work.

7. In a system for the intransit preservation of perishable products, an apparatus comprising in combination:
  (a) a storage chamber for said perishable products, the longitudinal axis of said storage chamber being horizontally aligned with end sections separated by a middle section;
  (b) a thermally insulated container associated with the storage chamber for storing pressurized low-boiling liquefied gas having a boiling point at atmospheric pressure below about −20° F.;
  (c) spray conduit means positioned within the upper portion of said storage chamber and extending substantially the entire length thereof with openings spaced along the length for discharging a multiplicity of discrete cold fluid streams into the storage chamber for cooling same;
  (d) first liquid discharge conduit means joined at one end to said container and joined at the other end to a first end of said spray conduit means;
  (e) liquefied gas flow control means comprising a temperature sensing element positioned within said storage chamber, a control valve operably interposed in said first liquid discharge conduit being connected to said temperature sensing element to be responsive to the storage chamber temperature as sensed by such element;
  (f) second liquid discharge conduit means communicating at one end with said container;
  (g) heat exchanger means communicating with a second end of said second liquid discharge conduit means for vaporizing and warming said liquefied gas;
  (h) a gas expander joined to said heat exchanger means for expanding the vaporized liquefied gas from higher to lower superatmospheric pressure and being powered solely by such gas expansion to produce rotational energy;
  (i) a fan positioned in the upper portion of said storage chamber at one end thereof and adjacent said spray conduit means for circulating discharged cold fluid substantially the end-to-end length of the chamber upper portion, said fan being joined to said gas expander for receiving said rotational energy.

8. Apparatus according to claim 7 in which said heat exchanger means is positioned within said storage chamber to recover heat therefrom for said vaporizing.

9. Apparatus according to claim 7 in which said heat exchanger means is positioned within said storage chamber to recover heat therefrom for said vaporizing, and second heat exchanger means are provided outside said storage chamber in the surrounding environment and in fluid communication with the vapor outlet from said heat exchanger means and the fluid inlet to said gas expander for superheating the vapor.

References Cited
UNITED STATES PATENTS

| | | | |
|---|---|---|---|
| 2,479,840 | 8/1949 | Johnson et al. | 62—239 X |
| 2,951,348 | 9/1960 | Loveday et al. | 62—50 |
| 3,121,999 | 2/1964 | Kasbohm et al. | 62—50 X |
| 3,241,329 | 3/1966 | Fritch et al. | 62—239 |
| 3,281,075 | 10/1966 | Snyers | 62—514 X |
| 3,287,925 | 11/1966 | Kane et al. | 62—514 X |
| 3,255,597 | 6/1966 | Carter | 62—239 |
| 3,271,970 | 9/1966 | Berner | 62—514 |
| 3,316,726 | 5/1967 | Pauliukonis | 62—514 |

LLOYD L. KING, *Primary Examiner.*

U.S. Cl. X.R.

62—239